US011039300B2

(12) United States Patent
Anslot et al.

(10) Patent No.: US 11,039,300 B2
(45) Date of Patent: Jun. 15, 2021

(54) METHOD FOR AN EUICC EMBEDDED INTO A MACHINE TYPE COMMUNICATION DEVICE TO TRIGGER THE DOWNLOAD OF A SUBSCRIPTION PROFILE

(71) Applicant: THALES DIS FRANCE SA, Meudon (FR)

(72) Inventors: Michel Anslot, Meudon (FR); Marc Lamberton, Meudon (FR); Xavier Berard, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 16/483,137

(22) PCT Filed: Jan. 29, 2018

(86) PCT No.: PCT/EP2018/052045
§ 371 (c)(1),
(2) Date: Aug. 2, 2019

(87) PCT Pub. No.: WO2018/141665
PCT Pub. Date: Aug. 9, 2018

(65) Prior Publication Data
US 2020/0021973 A1 Jan. 16, 2020

(30) Foreign Application Priority Data

Feb. 3, 2017 (EP) ..................... 17305124
Feb. 24, 2017 (EP) ..................... 17305203
(Continued)

(51) Int. Cl.
*H04W 8/24* (2009.01)
*H04W 8/20* (2009.01)
(Continued)

(52) U.S. Cl.
CPC ............... *H04W 8/205* (2013.01); *H04L 5/14* (2013.01); *H04L 61/2061* (2013.01);
(Continued)

(58) Field of Classification Search
CPC ......... H04W 8/245; H04W 8/20; H04W 8/24; H04W 12/0609; H04W 8/205;
(Continued)

(56) References Cited

U.S. PATENT DOCUMENTS 10,911,937 B2 * 2/2021 Anslot .................... H04W 8/18
2015/0087269 A1 3/2015 Lee et al.
(Continued)

FOREIGN PATENT DOCUMENTS

EP 2461613 A1 6/2012
WO WO2019053009 A1 * 3/2019

OTHER PUBLICATIONS

SIM Card of the Next-Generation Wireless Networks: Security, Potential Vulnerabilities and Solutions by S. Chitroub; N. Zidouni; H. Aouadia; D. Blaid; R. Laouar Published in: 2018 2nd European Conference on Electrical Engineering and Computer Science (EECS) Nov. 2019 (Year: 2019).*

(Continued)

*Primary Examiner* — William D Cumming
(74) *Attorney, Agent, or Firm* — The Jansson Firm; Pehr B. Jansson

(57) ABSTRACT

A method for an eUICC embedded into a machine type communication device to trigger the download of a subscription profile from a first network operator, the eUICC being provisioned with an eUICC identifier and a pre-loaded data set memorizing a range of International Mobile Subscription Identifiers associated to a second network operator by selecting randomly by the eUICC an IMSI number in the range memorized in the pre-loaded data set, sending an
(Continued)

attachment request comprising the randomly selected IMSI, receiving in an authentication request message the request for getting the eUICC identifier, as a response, sending to the discovery server a authentication failure message, receiving in an authentication request message a temporary IMSI from the discovery server so that the machine type communication device is able to attach to the first network operator and download the pending subscription profile.

10 Claims, 3 Drawing Sheets

(30) Foreign Application Priority Data

| | | | |
|---|---|---|---|
| Feb. 24, 2017 | (EP) | ................................ | 17305204 |
| Feb. 24, 2017 | (EP) | ................................ | 17305205 |
| Sep. 15, 2017 | (EP) | ................................ | 17306197 |

(51) Int. Cl.

| | |
|---|---|
| *H04W 12/04* | (2021.01) |
| *H04W 8/18* | (2009.01) |
| *H04W 76/10* | (2018.01) |
| *H04L 29/06* | (2006.01) |
| *H04L 5/14* | (2006.01) |
| *H04W 8/26* | (2009.01) |
| *H04W 4/70* | (2018.01) |
| *H04L 29/12* | (2006.01) |
| *H04W 48/18* | (2009.01) |
| *H04W 4/50* | (2018.01) |
| *H04W 12/06* | (2021.01) |
| *H04W 12/30* | (2021.01) |
| *H04W 12/041* | (2021.01) |
| *H04W 12/069* | (2021.01) |
| *H04W 12/42* | (2021.01) |

(52) U.S. Cl.
CPC ...... *H04L 61/2092* (2013.01); *H04L 63/0853* (2013.01); *H04L 67/42* (2013.01); *H04W 4/50* (2018.02); *H04W 4/70* (2018.02); *H04W 8/183* (2013.01); *H04W 8/26* (2013.01); *H04W 8/265* (2013.01); *H04W 12/04* (2013.01); *H04W 12/041* (2021.01); *H04W 12/06* (2013.01); *H04W 12/069* (2021.01); *H04W 12/35* (2021.01); *H04W 48/18* (2013.01); *H04W 76/10* (2018.02); *H04L 61/6054* (2013.01); *H04W 12/42* (2021.01)

(58) Field of Classification Search
CPC ....... H04W 8/265; H04W 12/04; H04W 8/18; H04L 9/3213; H04L 29/08
See application file for complete search history.

(56) References Cited

U.S. PATENT DOCUMENTS

| | | | | |
|---|---|---|---|---|
| 2018/0124595 | A1* | 5/2018 | Park | H04W 8/20 |
| 2019/0104401 | A1* | 4/2019 | Park | H04W 8/20 |
| 2019/0313246 | A1* | 10/2019 | Nix | H04L 9/3263 |
| 2019/0349751 | A1* | 11/2019 | Park | H04W 8/24 |
| 2020/0021973 | A1* | 1/2020 | Anslot | H04W 12/04 |
| 2020/0059778 | A1* | 2/2020 | Li | H04W 8/205 |
| 2020/0236529 | A1* | 7/2020 | Anslot | H04W 12/068 |

OTHER PUBLICATIONS

Nokia: "Using pools if IMSIs for privacy protection by frequent change", 3GPP Draft; S3-170452-V1 WAS S3-170194 Solution—Using Pools of IMSIS, 3rd Generation Partnership Project (3GPP), Mobile Competence Centre ; 650, Route Des Lucioles ; F-06921 Sophia-Antipolis Cedex ; vol. SA WG3, No. Sophia Antipolis (France); Feb. 6, 2017-Feb. 10, 2017 (Feb. 10, 2017), XP051228930.
PCT/EP2018/052045, International Search Report, dated Apr. 12, 2018, European Patent Office, P.B. 5818 Patentlaan 2 NL—2280 HV Rijswijk.
PCT/EP2018/052045, Written Opinion of the International Searching Authority, dated Apr. 12, 2018, European Patent Office, D-80298 Munich, Germany.

* cited by examiner

METHOD FOR AN EUICC EMBEDDED INTO A MACHINE TYPE COMMUNICATION DEVICE TO TRIGGER THE DOWNLOAD OF A SUBSCRIPTION PROFILE

TECHNICAL FIELD

The present invention relates to a method for an eUICC embedded into a machine type communication device to trigger the download of a subscription profile. It is applicable to the technical domain aiming at providing connectivity in an Internet of Things (IoT) system.

BACKGROUND OF THE INVENTION

According to the Recommendation ITU-T Y.2060 provided by the International Telecommunication institute, the Internet of things (IoT) is defined as a global infrastructure for the information society, enabling advanced services by interconnecting physical and virtual things based on existing and evolving interoperable information and communication technologies. A thing is an object of the physical world (physical things) or the information world (virtual things), which is capable of being identified and integrated into communication networks. At present, IoT is generally applied in fields such as security surveillance, automatic vending machines, public traffic systems, vehicle monitoring and management, industry process automatization, motor machineries, city informationalization.

In this description, the expression IoT device refers to a piece of equipment with communication capabilities and optionally capacity of data capture, sensing, data storage, sensing and/or data processing. An IoT device comprises for example a wireless communication module also called Machine Type Communication (MTC) or Machine to Machine (M2M) module allowing transmission of data from one IoT device to another or exchange of data between machines through UMTS/HSDPA, CDMA/EVDO, LTE, 5G, LoRa or other networks.

The GSM association (GSMA) has provided in may 2016 the 3.1 version of an embedded SIM specification called "Remote Provisioning Architecture for Embedded UICC Technical Specification". This specification provides a de-facto standard mechanism for the remote provisioning and management of machine to machine (M2M) connections, allowing the "over the air" provisioning of an initial operator subscription, and the subsequent change of subscription from one operator to another.

GSMA Embedded SIM is a vital enabler for Machine to Machine (M2M) connections including the simple and seamless mobile connection of all types of connected machines. According to this existing solution, the produced eUICC are shipped with a bootstrap operator profile to manage download to any operators. This solution is not flexible for the service provider and it generates roaming costs for profile download as the device is most of the time switched-on abroad. Further, the bootstrap operator is aware of the mobile network operator (MNO) profile downloads.

There is a need of a solution for deploying eUICC on the field that do not need all agreements signed by an eUICC manufacturer (EUM) and which allows to download a new profile when the IoT device embedding the eUICC is deployed abroad without roaming cost.

SUMMARY OF THE INVENTION

The invention relates to a method for an eUICC embedded into a machine type communication device to trigger the download of a subscription profile from a first network operator, the eUICC being provisioned with an eUICC identifier and a pre-loaded data set memorizing a range of International Mobile Subscription Identifiers (IMSI) associated to a second network operator, the method comprising the steps of:
  selecting randomly by the eUICC an IMSI number in the range memorized in the pre-loaded data set;
  sending an attachment request comprising the randomly selected IMSI for it to be received by a discovery server associated to the second network operator, the discovery server being adapted to generate a request for getting the eUICC identifier;
  receiving in an authentication request message the request for getting the eUICC identifier;
  as a response, sending to the discovery server a authentication failure message comprising an indication of a synchronisation failure and the eUICC identifier so that the discovery server is able to identify the first network operator as a provider of a subscription profile for this eUICC;
  receiving in an authentication request message a temporary IMSI from the discovery server so that the machine type communication device is able to attach to the first network operator and download the pending subscription profile, said temporary IMSI belonging to the first network operator and being allocated temporarily to the eUICC for enabling the download of the subscription profile.

According to an example, the method comprises a step triggering the pending subscription profile download procedure by opening automatically an HTTPS session with an SM-SR server operated a manufacturer of the eUICC.

According to an example, the request for getting the eUICC identifier is received in the authentication request message using at least one of the RAND or AUTN fields.

According to an example, the authentication request message is received with a new mobile subscription identification number in addition to the request for getting the eUICC identifier, the new mobile subscription identification number and the request for getting the eUICC identifier being received in at least one of the RAND or AUTN fields of the authentication request message.

According to an example, the eUICC identifier is transmitted into the AUTS field of the authentication failure message.

According to an example, the attachment request and the authentication failure message are sent to a server managing the mobility of machine type devices in a visited network.

According to an example, the authentication request message carrying the request for getting the eUICC identifier and the authentication request message carrying the temporary IMSI are received from a server managing the mobility of machine type devices in a visited network.

According to an example, the method comprises a step wherein once the temporary IMSI is received by the eUICC, a security key Ki is derived from the temporary IMSI.

According to an example, the security key Ki is derived using a key derivation algorithm that combines a preloaded security key memorized in the eUICC and the received t-IMSI.

According to an example, once the machine type communication device is attached to the target network, an access point name is automatically opened to download the subscription profile.

The invention also relates to an embedded UICC adapted to be embedded into a machine type communication device and to trigger the download of a subscription profile from a first network operator, the eUICC being provisioned with an eUICC identifier and a pre-loaded data set memorizing a range of International Mobile Subscription Identifiers associated to a second network operator, the eUICC being further configure to:

- select randomly by the eUICC an IMSI number in the range memorized in the pre-loaded data set;
- send an attachment request comprising the randomly selected IMSI for it to be received by a discovery server associated to the second network operator, the discovery server being adapted to generate a request for getting the eUICC identifier;
- receive in an authentication request message the request for getting the eUICC identifier;
- as a response, send to the discovery server a authentication failure message comprising an indication of a synchronisation failure and the eUICC identifier so that the discovery server is able to identify the first network operator as a provider of a subscription profile for this eUICC;
- receive in an authentication request message a temporary IMSI from the discovery server so that the machine type communication device is able to attach to the first network operator and download the pending subscription profile, said temporary IMSI belonging to the first network operator and being allocated temporarily to the eUICC for enabling the download of the subscription profile.

According to an example, the embedded UICC is configured to trigger the pending subscription profile download procedure by opening automatically an HTTPS session with an SM-SR server operated a manufacturer of the eUICC.

According to an example, the request for getting the eUICC identifier is received in the authentication request message using at least one of the RAND or AUTN fields.

According to an example, the authentication request message is received with a new mobile subscription identification number in addition to the request for getting the eUICC identifier, the new mobile subscription identification number and the request for getting the eUICC identifier being received in at least one of the RAND or AUTN fields of the authentication request message.

According to an example, the eUICC identifier is transmitted into the AUTS field of the authentication failure message.

According to an example, the attachment request and the authentication failure message are sent to a server managing the mobility of machine type devices in a visited network.

The invention also relates to a discovery server allowing the download of a subscription profile from a first network operator in an embedded UICC, the eUICC being provisioned with an eUICC identifier and a pre-loaded data set memorizing a range of International Mobile Subscription Identifiers associated to a second network operator, the discovery server being configured to:

- receive a randomly selected IMSI generated by the eUICC in a first Send Authentication Info message;
- send to the eUICC a request for getting the eUICC identifier in a first Send Authentication Info Acknowledgment message;
- receive the eUICC identifier in a second Send Authentication Info message;
- identify the first mobile network operator as a provider of a subscription profile for this eUICC;
- send to the eUICC a temporary IMSI in a second Send Authentication Info Acknowledgment message so that the machine type communication device is able to attach to the first network operator and able to download the pending subscription profile, said temporary IMSI belonging to the first network operator and being allocated temporarily to the eUICC for enabling the download of the subscription profile.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Figure 1:
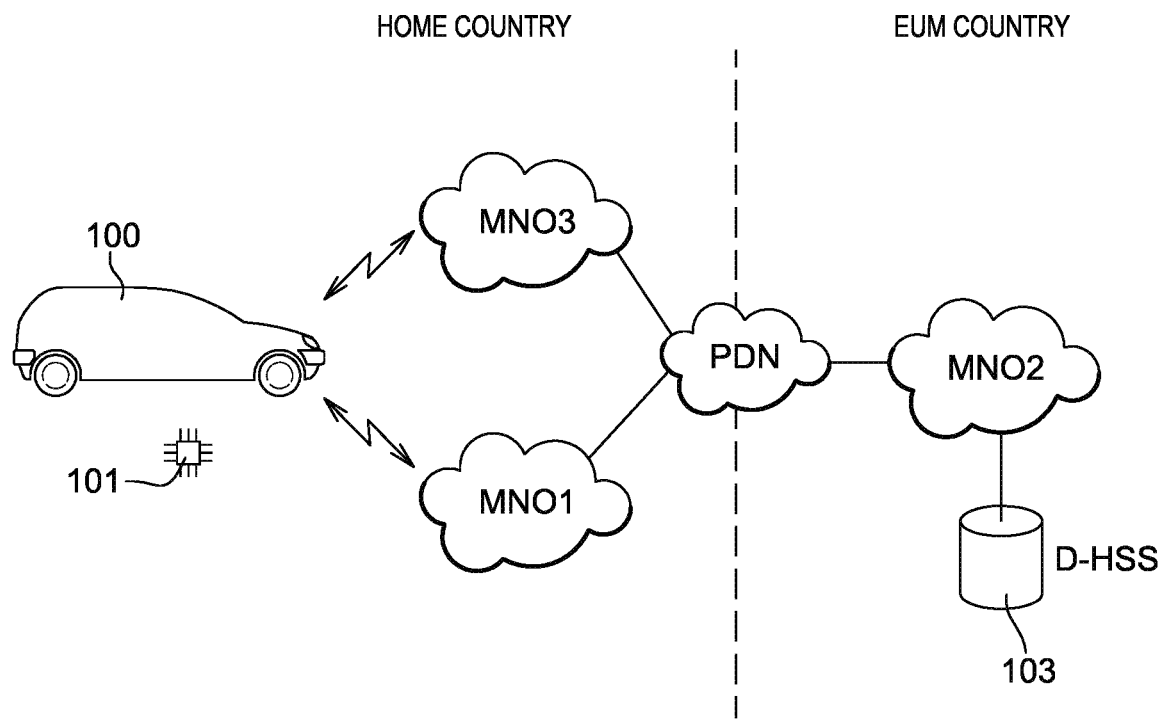
FIG. 1 illustrates schematically a technology in which an eUICC is activated for the first time in a country different from where it has been manufactured.

FIG. 1 illustrates schematically a technology in which an eUICC is activated for the first time in a country different from where it has been manufactured.

According to this example, an IoT device 100 embeds an eUICC 101.

An embedded Universal Integrated Circuit Card (eUICC), also called embedded SIM (eSIM), refers to a secure element designed to manage multiple mobile network operator subscriptions. It is available in various form factors, either plugged-in or soldered and is manufactured by an eUICC manufacturer (EUM). An eUICC is therefore easy to integrate in any kind of device.

According to the example illustrated in FIG. 1, the eUICC has been manufactured in a country designated hereafter as the eUICC manufacturer (EUM) country which is different from the user's home country. The user's home country refers to the country where the IoT device is purchased and mainly used. At the manufacturing stage, no commercial relation was set up between the EUM manufacturer and any mobile network operator present in the home country. However, a discovery server operated by the eUICC manufacturer (EUM) is for example associated to a mobile network operator MNO2 in the EUM country. A discovery server 103 is accessible from MNO2 and allows the monitoring of the activation of the eUICCs that are already deployed on the field in the home country of their respective users.

The described system is based on the use of a discovery server and an eUICC. In this description, an example of discovery server is mentioned and designated as a discovery server (D-HSS). A Home Subscriber Server (HSS) is a database server that is used in Long Term Evolution (LTE) networks for user identification and addressing, storing user profile information, mutual network-user authentication, ciphering and identity protection. A D-HSS is an example of discovery server and can be described as an HSS that is modified to implement the method described hereafter. It does not necessarily comprises all the functions implemented in a 3GPP compliant HSS. The skilled person will understand that the D-HSS is a type of discovery server that is proposed here for exemplary purpose. Other types of discovery servers can also implement the proposed technology.

The invention is hereafter described based on devices and equipment deployed in the so-called EUM and home countries. However, the skilled person will understand that other use cases can also be supported by the invention. For example, the IoT device embedding the eUICC is purchased in a first country where a subscription needs to be set up, the discovery server is localized in a second country and the mobile network operator that is associated to the discovery server is localized in a third country.

According to the example proposed in FIG. 1, at the eUICC manufacturing stage, no commercial agreement is set up between a mobile network operator of the user's home country and the EUM for it to provide connectivity to the owner of the newly acquired IoT device 100.

Following the eUICC manufacturing, the integration of the eUICC in an IoT device and the deployment on the field of the IoT device embedding the eUICC a commercial agreement can be set up between the IoT device manufacturer and the mobile network operator MNO1 called target operator. MNO1 will provide connectivity to the newly acquired IoT device 100. For that purpose, a subscription profile can be later generated and made available for a further download by the eUICC. This subscription profile is designated hereafter as a pending profile.

In this example, the IoT device 100 comprising the eUICC 101 is switched on for the first time. It generates a randomly chosen IMSI noted R-IMSI and an attachment procedure is launched. The initial connection is provided by a visited network MNO3 capable of exchanging data with MNO2 through a packet data network (PDN). The R-IMSI is such that it is associated to the discovery server. The IoT device therefore tries to attach to MNO2 linked to the discovery server 103.

However, the discovery server 103 is configured such that it detects the eUICC as requiring a pending profile from a target operator MNO1. The D-HSS is configured to know if a given target operator has a pending profile available for a given eUICC and in that case, it provides the eUICC with means to attach directly to the target operator MNO1 localized in the user's home country.

In other words, one aim is to create a dialog between a device embedding the eUICC and the discovery server (D-HSS) without being attached to a bootstrap cellular network.

The objective is to directly attach to the targeted operator network, MNO1 111 in this example, among a plurality of network operators in order to download the subscription profile with its associated credentials.

The proposed method and system is adapted for 3G and 4G/LTE networks without needing to modify the existing 3GPP specifications, as already existing messages are used. In addition, the proposed method and system can be implemented by the next generations of mobile networks including 5G and future standardized technologies.

The dialog between the discovery server (D-HSS) and the eUICC is based on the use of the four authentication messages that are usually exchanged during the device attachment between a terminal and the network. These four messages are generally referred as:

Attach request;
Authentication request;
Authentication failure;
Send Authentication Info (SAD.

For Universal Mobile Telecommunications Systems (UMTS) and Long Term Evolution (LTE) networks, these messages are respectively detailed in the 3GPP technical specifications 3GPP TS 24.008 "Mobile radio interface Layer 3 specification" and 3GPP TS 24.301 "Non-Access-Stratum (NAS) protocol for Evolved Packet System (EPS)".

Further, the proposed systems re-uses the "Send Authentication Info" (SAI) which is defined in 3GPP TS 29.002 for UMTS and System Architecture Evolution (SAE).

According to the proposed technology, the ATTACH REQUEST and the SEND AUTHENTICATION INFO (SAI) messages are used to transmit a randomly generated IMSI.

The randomly generated IMSI (R-IMSI) belongs to a range of IMSI defined in a data set which is preloaded in the eUICC at the manufacturing stage. In this example, the discovery server is associated to the mobile network operator MNO2 as the range of IMSI of the dataset preloaded in the eUICC corresponds to a list of IMSI owned by MNO2.

According to another embodiment, the eUICC manufacturer can operate its own mobile network operator. The discovery server and the associated mobile network will be in that case operated by the same actor. Said differently, MNO2 will be operated by the EUM as well as the discovery server. The eUICC manufacturer (EUM) can have a dedicated combination of mobile country code (MCC) and mobile network code (MNC) fields that will be used for the routing of messages toward the discovery server. In that case, it is not needed for the eUICC manufacturer (EUM) to operate a full infrastructure of a real MNO.

According to another embodiment, the mobile network operator MNO2 can be different from the EUM and operate by himself the discovery server (D-HSS).

Figure 2:
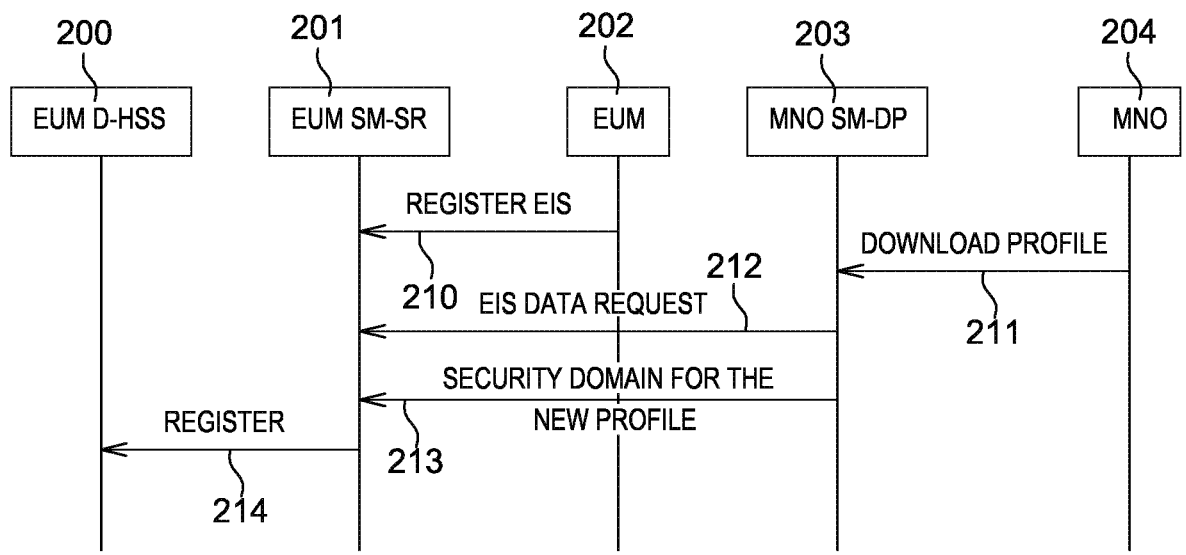
FIG. 2 is an example of sequence diagram illustrating how a discovery server is notified that a target mobile network operator is ready to upload a subscription profile in given eUICC.

FIG. 2 is an example of sequence diagram illustrating how a discovery server is notified that a target mobile network operator is ready to upload a subscription profile in given eUICC.

On this figure, a discovery server 200 operated by the eUICC manufacturer (EUM) 202 is represented. The EUM SM-SR 201 is the "Subscription Manager-Secure Routing" server, as defined in GSMA "Remote Provisioning Architecture for Embedded UICC Technical Specification", operated by the EUM and which is enhanced with functions to connect to the discovery server 200.

The MNO SM-DP 203 is the "Subscription Manager—Data Preparation", as defined in GSMA "Remote Provisioning Architecture for Embedded UICC Technical Specification", of the target mobile network operator. Its main role is to create, encrypt and install operator profiles into the eUICC.

The target mobile network operator is also represented 204 on the figure.

In this example, the EUM 202 has issued a new eUICC and registers 210 its eUICC information set (EIS) into the EUM SM-SR 201.

Then, a mobile network operator 204 called target MNO has contracted with the EUM 202 or with an M2M service provider using this eUICC in order to provide connectivity. The target mobile network operator 204 initiates 211 the profile download process and transmits for example to the MNO SM-DP 203 the eUICC identification (EID), an identifier of the EUM SM-SR 201 and an integrated circuit card identifier (ICCID).

The MNO SM-DP 203 requests 212 the eUICC information set (EIS) to the EUM SM-SR 201. For that purpose, it transmits the EID of the eUICC in order to get the corresponding EIS data.

The MNO SM-DP 203 then requests 213 to the EUM SM-SR to create a security domain for the new profile.

The EUM SM-SR 201 instructs 214 the discovery server 200 of an ongoing request for provisioning an eUICC identified by the aforementioned EID with a subscription profile associated to a target MNO 204.

Figure 3:
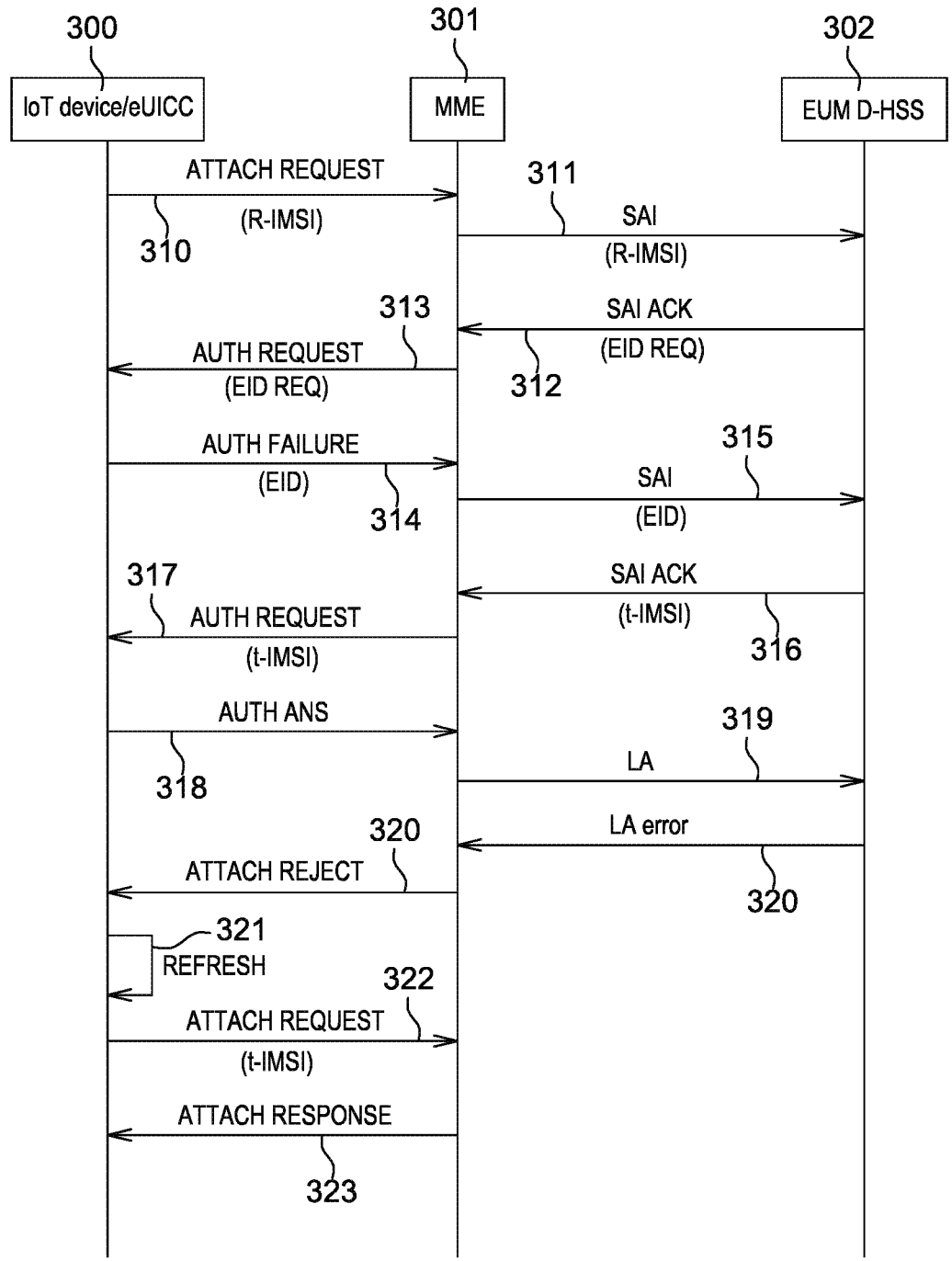
FIG. 3 illustrates a sequence diagram allowing to trigger by an IoT device the download of a subscription profile from a target network operator.

FIG. 3 illustrates a sequence diagram allowing to trigger by an IoT device the download of a subscription profile from a target mobile network operator.

On this figure, the discovery server 302 operated by the eUICC manufacturer (EUM) is represented and corresponds to reference 200. In addition, a mobility management entity (MME) of a mobile network operator and the target eUICC 300 are represented. The target eUICC 300 is an eUICC for which a target mobile network operator is available for providing it with a pending subscription profile (result of the operation described in FIG. 2).

According to this example, there is a subscription profile that is pending for the target eUICC 300. When the IoT device is switched on for the first time, it tries to attach to a mobile network using data contained in its pre-loaded data set. The pre-loaded data set is different from a bootstrap profile providing credentials for the eUICC to connect with a bootstrap operator. It only contains a predefined range of R-IMSI numbers allowing the eUICC to be detected by the discovery server 302.

The IoT device sends an attach request 310 message to the MME 301 of the visited network. It uses a conventional attach request message, for example one that is standardized in 3GPP for UMTS or LTE, but instead of transmitting an IMSI allocated to a subscriber, it transmits a random IMSI noted R-IMSI that is generated by the eUICC taking into account the IMSI range as defined in the pre-loaded profile. The attach request 310 may be sent from the eUICC 300 embedded in the IOT device.

Then, the MME 301 sends 311 a Send Authentication Info (SAI) message to the discovery server 302. The SAI message also contains the R-IMSI generated by the eUICC. The discovery server 302 is configured for being associated to the IMSI numbers that are belonging to the predefined range of IMSI that is pre-loaded in the eUICCs.

According to a preferred embodiment, the IMSI of the range memorized in the pre-loaded dataset of the eUICC have the same mobile network code (MNC) and mobile country code (MCC) fields as these IMSI are owned by the same operator (MNO2). Therefore, it is said that the discovery server is associated to this operator. The discovery server is generally operated by the eUICC manufacturer (EUM) and it can cooperate with a mobile network operator MNO2. Alternatively, the EUM can also be declared and act as a mobile network operator such a mobile virtual network operator (MVNO).

The discovery server 302 then replies to the MME 301 with an SAI acknowledgment message 312 comprising a request in the RAND and/or the AUTN fields for the eUICC to send the EID and optionally a new mobile subscription identification number (MSIN).

This new MSIN can be used to re-launch data exchanges between the IoT device and the discovery server in case of a failure in the process. Indeed, the re-use of the already generated R-IMSI can be blocked by the mobile network operator associated with the discovery server.

The MME 301 of the visited network then forwards the EID request and optionally the new MSIN to the target eUICC 300 using a standard authentication request message 313, the EID request and optionally the new MSIN being transmitted in the RAND and/or AUTN fields of the authentication request message 313.

The IoT device embedding the eUICC 300 then replies to the MME 301 using an authentication synchronization failure 314 message. The authentication synchronization failure 314 message may be sent by the eUICC. The number for bits of this message is the same as what is standardized in 3GPP specifications, but it is diverted in order to transmit the EID into the AUTS field of the authentication failure message 314.

The MME 301 then forwards 315 the authentication synchronization failure message to the discovery server 302 using a SAI message.

Once the EID is received by the discovery server 302, it looks-up the EID with its records and if there is a target operator ready for provisioning the eUICC with a subscription profile. It finds the EID and the EIS data as registered (see reference 210 of FIG. 2). It is then able to identify the target mobile network operator and to allocate a temporary IMSI (t-IMSI) to the target eUICC, said temporary IMSI belonging to the target operator and being allocated to the target eUICC for at least the duration of the profile download procedure.

The discovery server 302 replies 316 to the MME 311 of the visited network with a SAI ACK message 316 containing an IMSI switch command, the allocated t-IMSI and optionally the Operator Variant Algorithm Configuration Field (OPc) encoded in the RAND/AUTN fields of an authentication vector. As a reminder, an authentication vector is a set of parameters which provides temporary authentication data needed to engage authentication with a particular user.

The MME 301 of the visited network forwards the t-IMSI and the IMSI switch command using an authentication request transmitted 317 to the IoT device embedding the eUICC 300. The authentication request 317 may be received by the eUICC 300.

The IoT device embedding the eUICC 300 replies with an authentication answer message 318 containing a valid expected authentication response RES that is generated using the diverted RAND and AUTN fields received in the authentication request 317. The authentication response RES can be calculated according to 3GPP TS 133.102 in case of a UMTS transmission and 3GPP TS 33.401 in case of an LTE transmission.

Then, a location update message 319 (or a tracking area update TAU in case of an LTE compliant system) is transmitted 319 by the MME 301 of the visited network to the discovery server 302. The discovery server is configured to reject the attachment request as the discovery server is configured to forbid roaming and the attachment is rejected by the D-HSS with roaming not allowed. It leads to the transmission of an attach reject message 320 by the MME 301 to the IoT device embedding the eUICC 300.

At this stage, the eUICC is configured to use for the duration of the profile download procedure the received t-IMSI. The eUICC computes and sets up the security key Ki for the t-IMSI. According to an embodiment, the security key Ki is generated thanks to a key derivation algorithm combining a security key pre-loaded in the eUICC and the received t-IMSI. The discovery server is also able to generate to the same Ki. It is therefore possible to secure the data exchanges without requiring the transmission of the security key Ki over the air.

Then the eUICC sends 321 a "refresh" proactive command to the IoT device which triggers an eUICC initialization procedure. As a consequence, the IoT device attempts to attach again. An attach request 322 is transmitted, this time using the t-IMSI instead of the R-IMSI. The standard attachment procure (not represented) is then carried out and as the t-IMSI belongs to the target operator and this its network is configured to accept attachment with these predefined temporary IMSI, an attachment response 323 indicating that the attachment procedure is successful is received by the IoT device embedding the eUICC.

Once the IoT device is attached to the target network, it automatically opens an access point name (APN). The eUICC knowing that there is a subscription waiting for him (as the result of the successful attachment with the t-IMSI) can automatically initiates the Profile download procedure. No wakeup SMS is anymore required as the communication channel is already set up between the target MNO and the eUICC.

Figure 4:
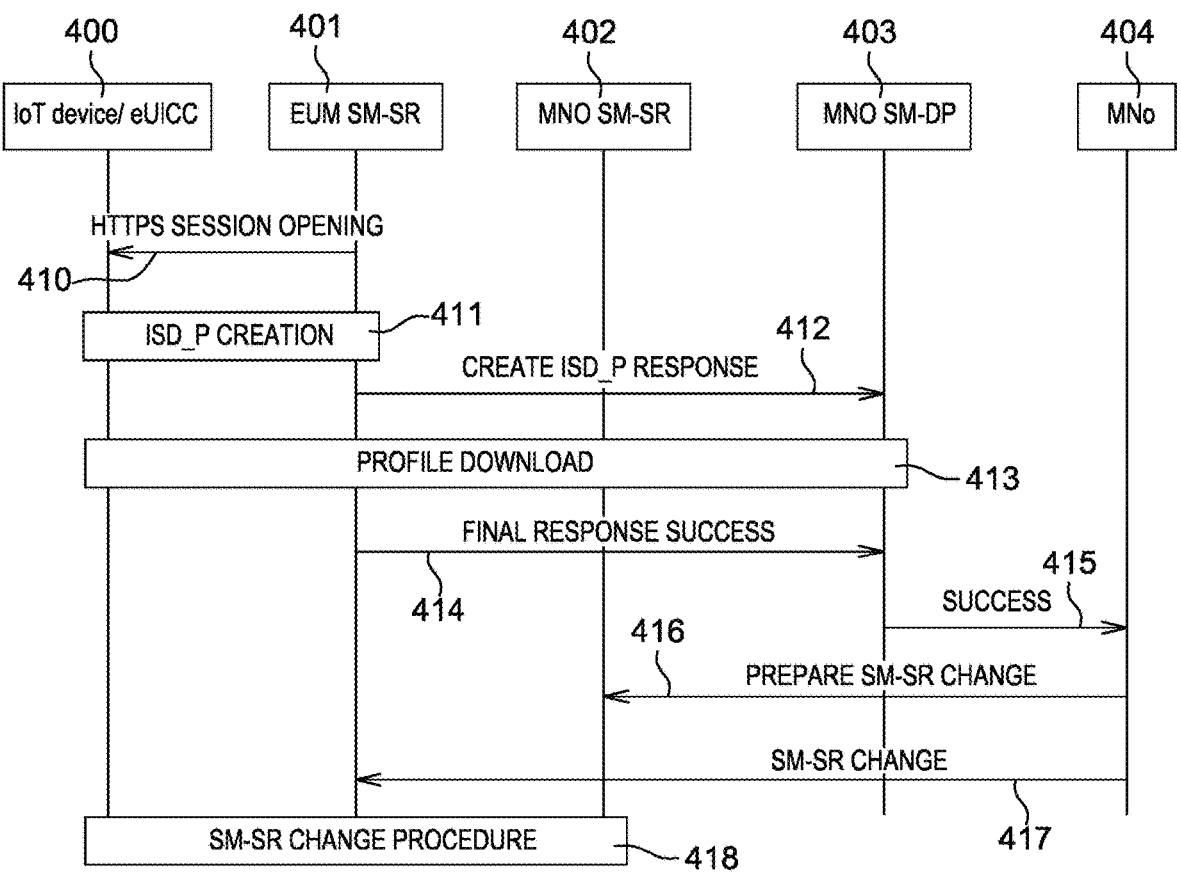
FIG. 4 describes how a pending profile is uploaded to an eUICC.

FIG. 4 describes how a pending profile is uploaded to an eUICC. First, the eUICC 410 opens an HTTPS session with the EUM SM-SR 401.

Then, the EUM SM-SR 401 (corresponding to reference 201) creates 411 a new profile container (ISD-P) and leave the HTTPS session opened.

The EUM SM-SR 401 acknowledges the ISD-P creation request by sending a message 412 to the MNO SM-DP 403.

The MNO SM-DP 403 (corresponding to reference 203) upload through the EUM SM-SR 401 the pending profile to the IoT device 400 (corresponding to reference 300). The newly downloaded profile is enabled on the eUICC. The EUM SM-SR 401 is provisioned by the MNO SM-DP 403 with the MSISDN of the newly downloaded subscription profile.

The MNO SM-DP server 403 is informed 414 of the completion of the operation as well as the target mobile network operator 415.

The eUICC sends a REFRESH proactive command (not represented and the IoT device 400 re-attaches with the operational profile.

The target MNO 416, 417 then initiates 315 and SM-SR transfer from the EUM SM-SR 401 to its own SM-SR 402. A standard SM-SR change procedure is then carried out 418. This step is optional if the target MNO doesn't operates its own SM-SR.

The invention claimed is:

1. A method for an embedded Universal Integrated Circuit Card (eUICC) embedded into a machine type communication device to trigger the download of a subscription profile from a first network operator, the eUICC being provisioned with an eUICC identifier and a pre-loaded data set memorizing a range of International Mobile Subscription Identifiers associated to a second network operator, the method comprising the steps of:

selecting randomly by the eUICC an international mobile subscriber identity (IMSI) number in the range memorized in the pre-loaded data set;

sending an attachment request comprising the randomly selected IMSI for it to be received by a discovery server associated to the second network operator, the discovery server being adapted to generate a request for getting the eUICC identifier;

receiving in an authentication request message the request for getting the eUICC identifier;

as a response, sending to the discovery server an authentication failure message comprising an indication of a synchronisation failure and the eUICC identifier so that the discovery server is able to identify the first network operator as a provider of a subscription profile for this eUICC;

receiving in an authentication request message a temporary IMSI from the discovery server so that the machine type communication device is able to attach to the first network operator and download the pending subscription profile, said temporary IMSI (t-IMSI) belonging to the first network operator and being allocated temporarily to the eUICC for enabling the download of the subscription profile.

2. The method according to claim 1, comprising a step triggering the pending subscription profile download procedure by opening automatically an HTTPS session with a secure messaging secure routing (SM-SR) server operated a manufacturer of the eUICC.

3. The method according to claim 1, wherein the authentication request message has RAND and AUTN fields and the request for getting the eUICC identifier is received in the authentication request message using at least one of the RAND or AUTN fields.

4. The method according to claim 1, wherein the authentication request message has RAND and AUTN fields and is received with a new mobile subscription identification number in addition to the request for getting the eUICC identifier, the new mobile subscription identification number (MSIN) and the request for getting the eUICC identifier being received in at least one of the RAND or AUTN fields of the authentication request message.

5. The method according to claim 1, wherein the authentication failure message has an AUTS field and the eUICC identifier is transmitted into the AUTS field of the authentication failure message.

6. The method according to claim 1, wherein the attachment request and the authentication failure message are sent to a server managing the mobility of machine type devices in a visited network.

7. The method according to claim 1, wherein the authentication request message carrying the request for getting the eUICC identifier and the authentication request message carrying the temporary IMSI are received from a server managing the mobility of machine type devices in a visited network.

8. The method according to claim 1, comprising a step wherein once the t-IMSI is received by the eUICC, a security key Ki is derived from the t-IMSI.

9. The method according to claim 8, wherein the security key Ki is derived using a key derivation algorithm that combines a preloaded security key memorized in the eUICC and the received t-IMSI.

10. The method according to claim 1 wherein once the machine type communication device is attached to the target network, an access point name is automatically opened to download the subscription profile.

* * * * *